United States Patent
Lord

(10) Patent No.: US 8,178,051 B2
(45) Date of Patent: May 15, 2012

(54) APPARATUS AND PROCESS FOR HYDROGENATION OF A SILICON TETRAHALIDE AND SILICON TO THE TRIHALOSILANE

(76) Inventor: Stephen Michael Lord, Encinitas, CA (US)

(*) Notice: Subject to any disclaimer, the term of this patent is extended or adjusted under 35 U.S.C. 154(b) by 609 days.

(21) Appl. No.: 12/291,115

(22) Filed: Nov. 5, 2008

(65) Prior Publication Data
US 2010/0111804 A1    May 6, 2010

(51) Int. Cl.
*B01J 8/24* (2006.01)
*C01B 33/107* (2006.01)

(52) U.S. Cl. ......... 422/139; 422/145; 422/146; 423/342

(58) Field of Classification Search .................. 422/129, 422/139, 143, 145, 146, 147; 423/341–343
See application file for complete search history.

(56) References Cited

U.S. PATENT DOCUMENTS

| | | | |
|---|---|---|---|
| 3,012,862 A * | 12/1961 | Bertrand et al. | 423/350 |
| 4,424,199 A * | 1/1984 | Iya | 423/349 |
| 4,526,769 A | 7/1985 | Ingle et al. | |
| 4,676,967 A | 6/1987 | Breneman | |
| 4,904,452 A * | 2/1990 | Acharya et al. | 422/146 |
| 4,906,441 A * | 3/1990 | Flagella | 422/146 |
| 5,422,088 A * | 6/1995 | Burgie et al. | 423/342 |
| 5,637,815 A | 6/1997 | Takahata | |
| 5,798,137 A * | 8/1998 | Lord et al. | 427/213 |
| 2009/0324477 A1 | 12/2009 | Mizushima et al. | |

FOREIGN PATENT DOCUMENTS

| | | | |
|---|---|---|---|
| GB | 1530986 A | * | 11/1978 |
| JP | 2008-184378 | | 8/2008 |
| WO | WO 2008-056550 | | 6/2008 |

OTHER PUBLICATIONS

Bade, S., Mechano-chemical reaction of metallurigal grade silicon with gaseous hydrogenchloride in a vibration mill, Int. J. Miner.,1996, 167-179, 44-45.
Ingle, W., Kinetics of the hydrogenation of silicon tetrachloride, J. Electrochem. Soc.: Solid-State Science and Technology,May 1985, 1236-1240,vol. 132, No. 5.

* cited by examiner

*Primary Examiner* — Jennifer A Leung

(57) ABSTRACT

A reactor for hydrogenation of a silicon tetrahalide and metallurgical grade silicon to trihalosilane includes a bed of metallurgical silicon particles, one or more gas entry ports, one or more solids entry ports, one or more solids drains and one or more ports for removing the trihalosilane from the reactor. Fresh surfaces are generated on the bed particles by internal grinding and abrasion as a result of entraining feed silicon particles in a silicon tetrahalide/hydrogen feed stream entering the reactor and impinging that stream on the bed of silicon particles. This has the advantages of higher yield of the trihalosilane, higher burnup rate of the MGS, removal of spent MGS as a fine dust carryover in the trihalosilane effluent leaving the reactor and longer times between shutdowns for bed removal.

5 Claims, 4 Drawing Sheets

Schematic diagram illustrating overall operation of the invention

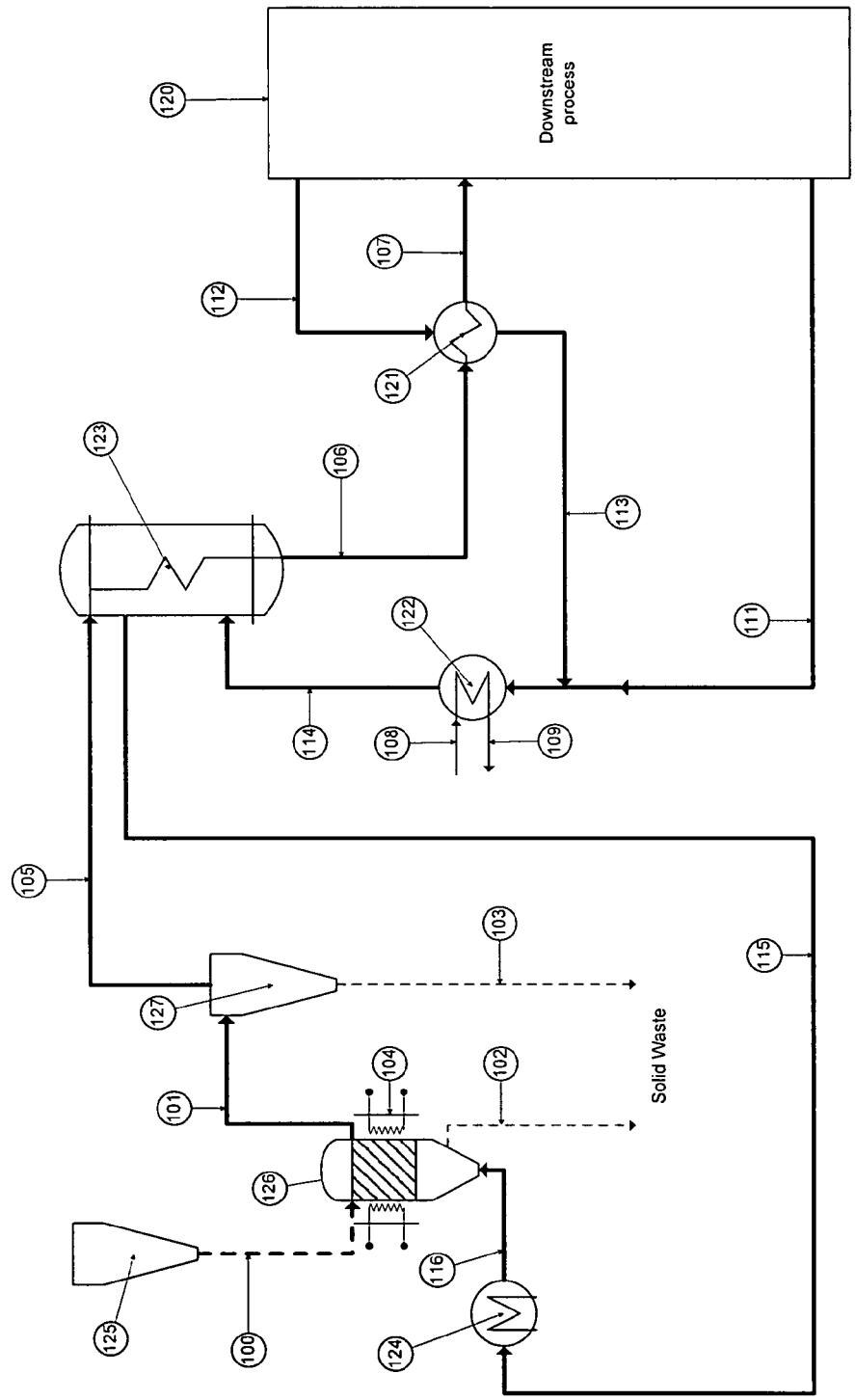
Fig 1. Schematic diagram illustrating overall operation of the invention

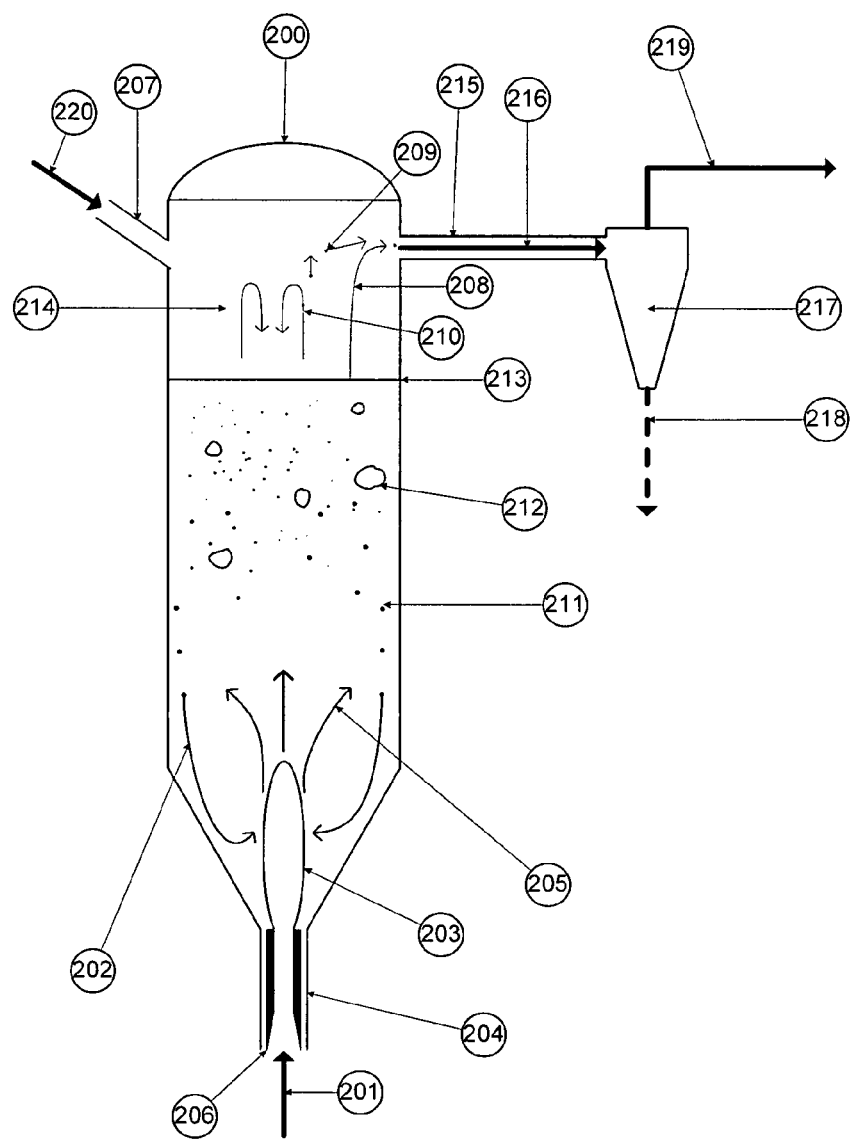
Fig 2. Cross sectional view of the reactor portion of the invention

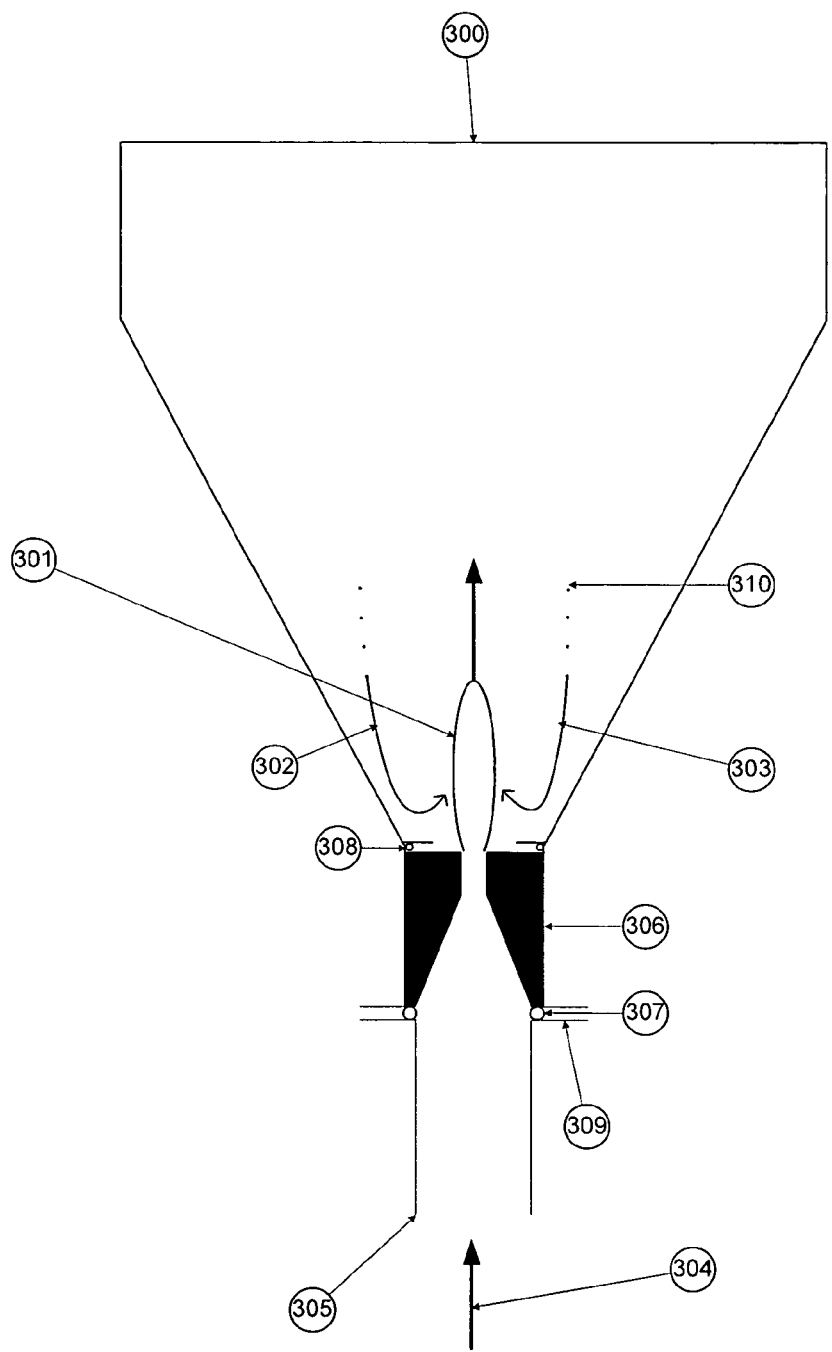
Fig 3. Cross sectional view of the attrition generating gas inlet of the invention

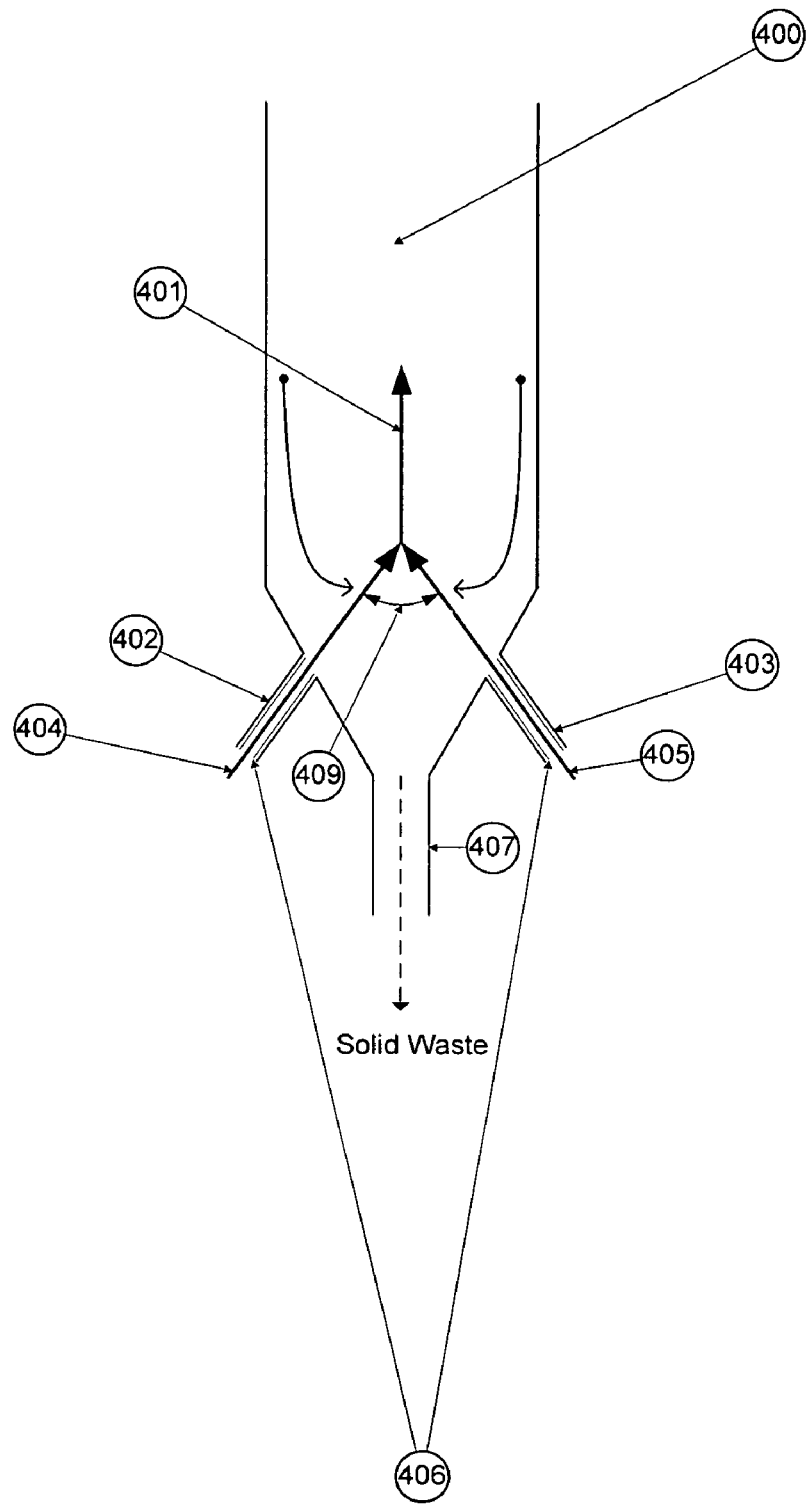
Fig 4. Cross sectional view of the two inlets

APPARATUS AND PROCESS FOR HYDROGENATION OF A SILICON TETRAHALIDE AND SILICON TO THE TRIHALOSILANE

BACKGROUND OF THE INVENTION

This invention relates generally to the field of high purity silicon production and more specifically to an apparatus and process for hydrogenation of a silicon tetrahalide and silicon to trihalosilane.

Trihalosilanes such as $SiHCl_3$ and $SiHBr_3$ were first made by the reaction of silicon with the respective hydrogen halide, HCl or HBr, at a temperature of approximately 350° C. and at approximately atmospheric pressure. Yields from this reaction are typically very high, the literature showing yields in excess of 90%, with the remainder being silicon tetrahalide. The trihalosilane most commonly used is trichlorosilane which is purified and decomposed to form very pure silicon. This decomposition reaction also forms the silicon tetrahalide which thus builds up in the process. Various measure have been taken to minimize the production of silicon tetrahalide such as recycling the tetrahalide and using a large excess of hydrogen in the decomposition reactor. The excess tetrahalide has also been oxidized to amorphous silica with the resulting halogen gases being scrubbed. A more recent innovation, based on research by DOE/JPL and described in Breneman U.S. Pat. No. 4,676,967, converts the excess silicon tetrahalide to the trihalosilane by reacting it with hydrogen and silicon at high temperature and pressure in the presence of a copper catalyst.

The prior hydrogenation technology disclosed in Breneman U.S. Pat. No. 4,676,967 conducts the reaction between silicon, silicon tetrachloride and hydrogen at about 400° C.-600° C. and between 300 and 600 psi in a fluidized bed reactor containing a distribution means above a mixing plenum. In commercial embodiments of the above patent the inlet gas streams of silicon tetrachloride and hydrogen are preferentially heated separately to different temperatures and pressures then mixed in the mixing plenum before passing through the distribution means to form bubbles which contact and fluidize the finely divided silicon. The hydrogen is heated to 500° C. at 325 psig while the silicon tetrachloride is heated to 500° C. at 575 psig, which is above the 530 psig critical pressure of silicon tetrachloride, and then depressurized to 325 psig on mixing with the hydrogen.

The commercial reactors designed according to Breneman have a lesser yield than smaller scale laboratory tests, such as the ones by Ingle, discussed in "Kinetics of the Hydrogenation of Silicon Tetrachloride, W. Ingle and M. Peffley, J. Electrochem Soc may 1985, pg 1236-1240" and the yield decreases with time with the ultimate need to dump the entire bed of silicon and start over with fresh material. Delaying the mixing to the mixing plenum increases the capital cost and operating cost because it makes heat recovery from the hot effluent gases more difficult and causes operational problems. The silicon tetrahalide frequently contains significant traces of the trihalosilane and dihalosilane which can decompose to silicon inside the tetrahalide heaters causing plugging. Using two separate preheaters increases the capital cost compared to a single train and makes it more difficult to recover heat from the exhaust gas which increases the use of utilities. The provision of a distribution means increases capital cost.

The lower yield of commercial reactors can be attributed to the design of the distribution means and selection of typical fluidized bed operating conditions which cause bypassing of the silicon by large bubbles of reacting gas which means some of the reacting gas has a very short residence time. From Ingle it can be seen that yield depends on residence time but eventually reaches a plateau; thus a mixture of gas with low and high residence time will have a lower yield than one with the same average residence time where all the gas has the same residence time. The decrease in yield with time is caused by buildup of impurities on the surface of the silicon bed materials, as discussed in Bade, S., "Mechano-chemical reaction of metallurigal grade silicon with gaseous hydrogenchloride in a vibration mill, S. Bade et al, Int. J. Mineral Processing 44-45 (1996) 167-179". The design of the plenum according to standard fluidized bed practice minimizes the amount of attrition which is thus inadequate to provide sufficient new reactive surface. In order to improve the yield it is important to define the process conditions in a more specific way than the very general definition of a temperature between 400° C.-600° C. and 300 to 600 psi. The key criteria is the ratio of the superficial velocity, U, to the minimum bubbling velocity, $U_{mb}$, ($U/U_{mb}$). The superficial velocity is the actual volumetric flow, adjusted for operating temperature and pressure, divided by the cross-sectional area of the vessel. The minimum bubbling velocity, $U_{mb}$ is the minimum superficial velocity at which bubbles are formed, and is of importance because bubbles move faster than gas in the voids between particles and thus have less residence time. This velocity depends on the gas properties and on the size, shape and density of the granular particles. There are many ways to calculate this property, including computer programs. For large, greater than 200 micron, particles the $U_{mb}$ is essentially the same as the superficial velocity at minimum fluidization, $U_{mf}$. Providing more comminution is known to be valuable in the similar process of reacting metallurgical grade silicon with hydrogen chloride as is discussed in Bade. The comminution increases reaction rate and yield but the Bade method of using a ball mill makes it difficult and expensive to implement at the high pressure, 500 psig, and high temperature, 500° C., needed for this reaction.

Thus what is desired is a reactor and a set of operating conditions which provide more even gas-solids contacting, more comminution, better energy recovery and lower capital and operating cost.

SUMMARY OF THE INVENTION

Systems incorporating the invention provide higher yield of the trihalosilane, lower fabrication cost lower cost of operation, high consumption of feed silicon flexible size distribution requirements for the feed metallurgical grade silicon and a flexible operation.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, an apparatus for hydrogenation of a silicon tetrahalide and silicon to trihalosilane comprises: a vessel with no internal flow distribution, one or more gas entries, one or more solids entries, one or more solids drains, one or more gas/solids exits and fresh surface generation by jet grinding. Also further disclosed is a process for choosing a set of operating conditions to take full advantage of the apparatus and an example of improved heat integration. This apparatus has the advantages of higher reaction rates, higher yields of trihalosilane and lower capital and operating costs by better heat integration with the remainder of the process.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a schematic diagram illustrating the overall operation of a system incorporating the invention.

FIG. 2 is a cross sectional view of the reactor portion of FIG. 1.

FIG. 3 is a cross sectional view of the attrition generating gas inlet of the reactor portion of FIG. 2.

FIG. 4 is a modified version of FIG. 3 showing two inlets

DETAILED DESCRIPTION

A detailed descriptions of an embodiment incorporating features of the invention is provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Turning first to FIG. 1 there is shown an overall flow diagram illustrating an embodiment of the invention used to save energy costs when integrated into the overall process for production of the trihalosilane. A high pressure recycle liquid silicon tetrahalide stream 112, comes from a downstream process 120, and is preheated in a first heat exchanger 121, by heat exchange with an effluent gas stream 106, to form a heated stream 113, which is then is mixed with a recycled compressed hydrogen stream 111, also from the downstream process 120, to reduce the evaporation temperature of the liquid silicon tetrahalide stream 112. The mixture is then evaporated in an evaporator 122. The heat can be provided by any utility, but it is particularly advantageous to use steam 108 and recover a condensate 109. A resulting mixed vapor stream 114 is then heated by a second heat exchanger 123 which simultaneously cools a cyclone effluent stream 105 from a reactor cyclone 127. A very hot, 450° C.-550° C., stream 115 exiting the second heat exchanger 123 is further heated with an electric heater 124 to bring the temperature up to 500° C.-600° C. in an inlet gas stream 116, prior to entering a hydrogenation reactor 126 with its own electrical heater 104. This heater can be external as shown or can be internal with penetrations through the reactor wall. Granulated metallurgical grade silicon, MGS, typically from about 440 to about 700 microns in diameter, is intermittently added from a lock hopper 125 via an MGS stream 100 and reacts with the 500-600° C. inlet gas stream 116 to form the desired trichlorosilane product stream 101. This product stream 101 then enters the cyclone 127 where a primary solid waste stream 102 of spent metallurgical grade silicon is removed. The cyclone effluent 105 is then cooled in the second heat exchanger 123 to form the cooled effluent gas stream 106 which is then further cooled by the first heat exchanger 121 to form a cooled stream 107 which then continues on to the downstream process 120. In the prior art the yield decreased with time so a primary waste stream 102 was also removed from the process on a periodic basis, typically one year, by emptying the entire reactor. This is not desired because of the loss of yield during operation and the time and consequent loss of production involved in the shutdown. In the present process grinding (attrition) is provided to remove the unreactive surface layer that builds up in the reator 102 over time and to thus remove it as dust in the cyclone waste stream 103. The specific design of the attrition mechanisms are discussed below in regard to FIGS. 2 and 3.

FIG. 2 is a cross sectional view of a reactor 200 portion, corresponding to the hydrogenation reactor 126 of FIG. 1. A gas flow 201, which corresponds to the 500-600° C. inlet gas stream 116 of FIG. 1, enters through a ceramic insert 206 in an inlet nozzle 204 located at the bottom of the reactor 126, entraining some solid silicon particles 202 as it forms an internal jet 203. The gas in the jet 203 then accelerates the entrained particles 202 until they hit a bed of particles 211 positioned within the reactor at which time grinding occurs due to the impact of the fast moving entrained particles 202 with the relatively stationary particles 211 in the bulk of the bed. The reactor does not contain any internal flow distributors to direct the flow path of the inlet gas streams. Gas 205 diffuses from the jet 203, and flows upwards through the bed of stationary particles 211. A fraction of the gas may form bubbles 212, as shown but this is not required for operation. In fact, it is preferred that at least 90% of the volume of the bed is free of bubbles. An effluent gas 208 leaves the top 213 of the bed of particles 211 and carries with it some small dust particles 209 some of which drop out 210 in a disengaging space 214 above the bed and some are carried out with the effluent gas 208 through an exit 215. The effluent gas 208 which is a gas and dust mixture stream 216 then goes into the cyclone 217, which corresponds to the cyclone 127 of FIG. 1, where most of the dust 218 is removed in a cyclone waste stream 103, and the cleaned gas leaves from the top of the cyclone in a stream 219, which corresponds to the cyclone effluent stream 105 of FIG. 1. Additional metallurgical grade silicon 220 is added through a silicon inlet port 207 which is shown as entering through the side near the top of the reactor 200. While the reactor is described as having a ceramic insert 206 in an inlet nozzle 204 one or more of other inlets and outlets can also be lined with an abrasion resistant ceramic composition. Suitable materials include, but are not limited to silicon nitride, silicon oxide, silicon oxynitride, alumina, mullite or silicon carbide FIG. 3 is a further expanded cross-sectional view of a reactor inlet 300 filled with a bed of MGS particles 310 (corresponding to the bed of particles 211 of FIG. 2). A single inlet 305 is designed to produce high attrition of the metallurgical silicon particles 310 by using an inlet gas stream 304 (corresponding to the 500-600° C. inlet gas stream 116 of FIG. 1) to entrain the particles 310 and accelerate them in a jet 301 (corresponding to the internal jet 203 of FIG. 2) until they collide with slow moving particles in the bulk of the bed 211. Particle flow paths 302, 303 show the general direction of the particles 202 as they come down the cone walls into the jet 301. The inlet 305 is lined with a removable ceramic insert 306 (corresponding to ceramic insert 206 of FIG. 2) to reduce the wear caused by attrition which is also shaped to increase the velocity of the inlet gas 304. The shape of the ceramic insert 306 and opening into the bed 211 can be changed to modify the pressure drop and attrition as necessary to tune the reactor 200. The insert is retained by a retention ring 308 fastened to the inside of the reactor and cushioned with a flexible high temperature gasket 307 at the top and bottom. The bottom of the insert is supported by a smaller diameter reducing flange 309 which is preferably the same internal diameter as the ceramic insert 306.

FIG. 4 shows a variation of FIG. 3. Dual inlets 402, 403, are similar in design to those in FIG. 3 with each inlet 402, 403 having a ceramic insert 406 to reduce the wear caused by the attrition. Inlet gas streams 404, 405; enter through the inlets 402, 403 and then collide in the center of the reactor to form a single vertical jet 401. The lateral vector of the velocity of each jet is converted to attrition at a higher rate than the vertical vector because the lateral vectors oppose each other whereas the vertical vector impacts into a bed of particles which are free to move. Thus the two interacting jets produce more attrition than would be expected from the same conditions for two non-interacting jets. The increase in attrition is related to an angle 409 between the intersecting gas streams 404, 405 and reaches a maximum when the angle equals 180 degrees. The attrition provided serves to remove the already reacted surface of the particles 211 and exposes a fresh silicon surface to attack which increases the reaction rate and hence the throughput and yield of trihalosilane. The solid residue which would otherwise stay in the reactor is transported out as small surface dust particles. A center drain 407 for removing the bed is shown also.

Table 1, attached as an Appendix hereto, presents the flows and temperatures of an example of the process. Based on the conditions shown in Table 1 operating conditions can be selected to minimize bubbling and maximize yield and throughput and as a result maximize the production of the desired trihalosilane for a given reactor. The maximum velocity that can occur without bubbling is, by definition, the minimum bubbling velocity, $U_{mb}$. Operating at $U/U_{mb}$ of 1 gives the maximum flow without bubbling. As noted above this can be calculated in many ways but one particularly useful equation is the David and Harrison equation:

$$U_{mb}=U_{mf}=0.0055*\epsilon^3/(1-\epsilon)gD_p^2(\rho_p-\rho_f)/\mu_f$$

Where: $\epsilon$ is the voidage at $U_{mb}$
g is the acceleration of gravity
$D_p$ is the diameter of the particle
$\rho_p$ is the particle density
$\rho_f$ is the fluid density.
$\mu_f$ is the viscosity of the fluid The value of the voidage depends on the shape of the particle and can be measured for any given sample of metallurgical grade silicon. The diameter of the particle is the average projected diameter and can be measured by standard sieving techniques and adjusted as necessary for the sphericity. The viscosity of the gas increases with temperature and is dependent on the composition. There are several standard ways to accurately predict it. The easiest way to increase the $U_{mb}$ is to increase the average particle diameter, $D_p$.

EXAMPLE 1

The gas inlet composition is as in Table 1
$\epsilon$ is the voidage at $U_{mb}$=0.4
g is the acceleration of gravity=980 m/s$^2$
$D_p$ is the diameter of the particle=To be calculated
$\rho_p$ is the particle density=2.33 g/cc
$\rho_f$ is the fluid density=0.0218 g/cc
$\mu_f$ is the viscosity of the fluid=0.00024 poise
U is the max. superficial velocity=0.11 m/sec=$U_{mb}$ Therefore the desired minimum average particle size=444 microns. Since MGS is quite angular this particle size should be adjusted by dividing by the sphericity which is typically about 0.86. This gives the average particle size, 516 microns as measured by sieve analysis. Further standard population balance calculations can be made to allow for the shrinkage of the particle due to reaction and the decrease in size due to attrition to arrive at the required minimum average particle size for the feed to the reactor. Once a reasonable estimate has been obtained for the correct particle size for the feed, a test may be performed.

EXAMPLE 2

A reactor 10 meters long was charged with a 7 m high bed using MGS of a nominal 750 micron size. The reactor was run for 120 hours under the conditions of Table 1 and batches of metallurgical grade silicon] were added once per hour to maintain level. At the end of the run a sample of the MGS in the bed was taken from the bed and analyzed and the results are shown below.

TABLE 2

Weight % of Particles in a sieve size range

| Sieve size Microns | Particle Wt % |
|---|---|
| 0-50 | 0.03% |
| 50-100 | 0.24% |
| 100-150 | 0.61% |
| 150-200 | 0.96% |
| 200-250 | 0.94% |
| 250-300 | 2.44% |
| 300-350 | 5.16% |
| 350-400 | 3.85% |
| 400-450 | 5.49% |
| 450-500 | 7.53% |
| 500-550 | 10.02% |
| 600-600 | 13.01% |
| 650-650 | 14.88% |
| 650-700 | 16.52% |
| 700-750 | 15.24% |
| 750-800 | 3.08% |

The average particle size was calculated at 538 microns

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

TABLE 1

Mass Balance of the process

| Stream Number | | | | | |
|---|---|---|---|---|---|
| 114 | 115 | 116 | 100 | 102 | 101 |
| Temperature (° C.) | | | | | |
| 151.30 | 524.90 | 600.00 | 25.00 | 50.00 | 600.00 |
| Pressure (atm) | | | | | |
| 29.94 | 29.67 | 29.19 | 1.00 | 1.00 | 25.19 |

TABLE 1-continued

Mass Balance of the process

| | | Total molar flow (kmol/h) | | | | | |
|---|---|---|---|---|---|---|---|
| | | 115.63 kmol/h | 115.63 kmol/h | 115.63 kmol/h | 3.92 kmol/h | 0.00 kmol/h | 111.84 kmol/h |
| Formula | MW g/mol | | | | | | |
| *Gases/Liquids* | | | | | | | |
| $H_2(g)$ | 2.016 | 7.44E+01 | 7.44E+01 | 7.44E+01 | 0.00E+00 | 0.00E+00 | 6.72E+01 |
| $SiCl_4$ (g + l) | 169.898 | 3.92E+01 | 3.92E+01 | 3.92E+01 | 0.00E+00 | 0.00E+00 | 2.83E+01 |
| $SiHCl_3$ (g + l) | 135.452 | 1.16E+00 | 1.16E+00 | 1.16E+00 | 0.00E+00 | 0.00E+00 | 1.59E+01 |
| $SiH_2Cl_2$ (g + l) | 101.007 | 8.50E−02 | 8.50E−02 | 8.50E−02 | 0.00E+00 | 0.00E+00 | 1.79E−01 |
| HCl(g) | 36.461 | 6.74E−01 | 6.74E−01 | 6.74E−01 | 0.00E+00 | 0.00E+00 | 1.95E−01 |
| $AlCl_3$(g) | 133.341 | 7.12E−04 | 7.12E−04 | 7.12E−04 | 0.00E+00 | 0.00E+00 | 1.22E−02 |
| $CH_4$(g) | 16.043 | 4.91E−02 | 4.91E−02 | 4.91E−02 | 0.00E+00 | 0.00E+00 | 5.84E−02 |
| $Si(CH_3)Cl_3$ (g + l) | 149.479 | 5.01E−04 | 5.01E−04 | 5.01E−04 | 0.00E+00 | 0.00E+00 | 5.48E−04 |
| $SiH(CH_3)Cl_2$ (g + l) | 115.034 | 1.55E−04 | 1.55E−04 | 1.55E−04 | 0.00E+00 | 0.00E+00 | 1.55E−04 |
| $TiCl_4$(g) | 189.712 | 1.14E−04 | 1.14E−04 | 1.14E−04 | 0.00E+00 | 0.00E+00 | 6.11E−04 |
| $TiCl_4$(l) | 189.712 | 0.00E+00 | 0.00E+00 | 0.00E+00 | 0.00E+00 | 0.00E+00 | 0.00E+00 |
| $PH_3$(g) | 33.997 | 3.66E−04 | 3.66E−04 | 3.66E−04 | 0.00E+00 | 0.00E+00 | 4.33E−04 |
| $BCl_3$ (g + l) | 117.169 | 7.68E−05 | 7.68E−05 | 7.68E−05 | 0.00E+00 | 0.00E+00 | 2.00E−04 |
| *Solids* | | | | | | | |
| Cu | 63.546 | 8.23E−06 | 8.23E−06 | 8.23E−06 | 1.31E−03 | 3.85E−05 | 1.25E−03 |
| Si | 28.086 | 2.48E−04 | 2.48E−04 | 2.48E−04 | 3.89E+00 | 1.16E−03 | 3.75E−02 |
| FeSi | 83.933 | 3.00E−05 | 3.00E−05 | 3.00E−05 | 0.00E+00 | 1.40E−04 | 4.54E−03 |
| $CaCl_2$ | 110.986 | 5.15E−06 | 5.15E−06 | 5.15E−06 | 0.00E+00 | 2.41E−05 | 7.79E−04 |
| $Cu_3As$ | 265.560 | 7.95E−08 | 7.95E−08 | 7.95E−08 | 0.00E+00 | 3.72E−07 | 1.20E−05 |
| As | 74.922 | 1.05E−07 | 1.05E−07 | 1.05E−07 | 2.94E−05 | 4.92E−07 | 1.59E−05 |
| $CrCl_2$ | 122.902 | 1.34E−07 | 1.34E−07 | 1.34E−07 | 0.00E+00 | 6.24E−07 | 2.02E−05 |
| $AlCl_3$(s) | 133.341 | 0.00E+00 | 0.00E+00 | 0.00E+00 | 0.00E+00 | 0.00E+00 | 0.00E+00 |

| | | Stream Number | | | | | |
|---|---|---|---|---|---|---|---|
| | | 103 | 105 | 106 | 107 | 112 | 113 |
| | | Temperature (° C.) | | | | | |
| | | 50.00 | 550.00 | 176.30 | 130.00 | 100.00 | 162.70 |
| | | Pressure (atm) | | | | | |
| | | 1.00 | 24.39 | 24.25 | 24.12 | 29.90 | 29.80 |
| | | Total molar flow (kmol/h) | | | | | |
| | | 0.04 kmol/h | 111.80 kmol/h | 111.80 kmol/h | 111.80 kmol/h | 40.13 kmol/h | 40.13 kmol/h |
| Formula | MW g/mol | | | | | | |
| *Gases/Liquids* | | | | | | | |
| $H_2$(g) | 2.016 | 0.00E+00 | 6.72E+01 | 6.72E+01 | 6.72E+01 | 0.00E+00 | 0.00E+00 |
| $SiCl_4$ (g + l) | 169.898 | 0.00E+00 | 2.83E+01 | 2.83E+01 | 2.83E+01 | 3.92E+01 | 3.92E+01 |
| $SiHCl_3$ (g + l) | 135.452 | 0.00E+00 | 1.59E+01 | 1.59E+01 | 1.59E+01 | 9.03E−01 | 9.03E−01 |
| $SiH_2Cl_2$ (g + l) | 101.007 | 0.00E+00 | 1.79E−01 | 1.79E−01 | 1.79E−01 | 2.03E−06 | 2.03E−06 |
| HCl(g) | 36.461 | 0.00E+00 | 1.95E−01 | 1.95E−01 | 1.95E−01 | 0.00E+00 | 0.00E+00 |
| $AlCl_3$(g) | 133.341 | 0.00E+00 | 1.22E−02 | 0.00E+00 | 1.98E−03 | 7.12E−04 | 7.12E−04 |
| $CH_4$(g) | 16.043 | 0.00E+00 | 5.84E−02 | 5.84E−02 | 5.84E−02 | 0.00E+00 | 0.00E+00 |
| $Si(CH_3)Cl_3$ (g + l) | 149.479 | 0.00E+00 | 5.48E−04 | 5.48E−04 | 5.48E−04 | 5.01E−04 | 5.01E−04 |
| $SiH(CH_3)Cl_2$ (g + l) | 115.034 | 0.00E+00 | 1.55E−04 | 1.55E−04 | 1.55E−04 | 1.55E−04 | 1.55E−04 |
| $TiCl_4$(g) | 189.712 | 0.00E+00 | 6.11E−04 | 0.00E+00 | 0.00E+00 | 0.00E+00 | 0.00E+00 |
| $TiCl_4$(l) | 189.712 | 0.00E+00 | 0.00E+00 | 6.11E−04 | 6.11E−04 | 1.14E−04 | 1.14E−04 |
| $PH_3$(g) | 33.997 | 0.00E+00 | 4.33E−04 | 4.33E−04 | 4.33E−04 | 0.00E+00 | 0.00E+00 |
| $BCl_3$ (g + l) | 117.169 | 0.00E+00 | 2.00E−04 | 2.00E−04 | 2.00E−04 | 1.79E−10 | 1.79E−10 |
| *Solids* | | | | | | | |
| Cu | 63.546 | 1.20E−03 | 4.98E−05 | 4.98E−05 | 4.98E−05 | 8.23E−06 | 8.23E−06 |
| Si | 28.086 | 3.60E−02 | 1.50E−03 | 1.50E−03 | 1.50E−03 | 2.48E−04 | 2.48E−04 |
| FeSi | 83.933 | 4.36E−03 | 1.82E−04 | 1.82E−04 | 1.82E−04 | 3.00E−05 | 3.00E−05 |
| $CaCl_2$ | 110.986 | 7.48E−04 | 3.11E−05 | 3.11E−05 | 3.11E−05 | 5.15E−06 | 5.15E−06 |
| $Cu_3As$ | 265.560 | 1.15E−05 | 4.81E−07 | 4.81E−07 | 4.81E−07 | 7.95E−08 | 7.95E−08 |
| As | 74.922 | 1.53E−05 | 6.36E−07 | 6.36E−07 | 6.36E−07 | 1.05E−07 | 1.05E−07 |
| $CrCl_2$ | 122.902 | 1.94E−05 | 8.08E−07 | 8.08E−07 | 8.08E−07 | 1.34E−07 | 1.34E−07 |
| $AlCl_3$(s) | 133.341 | 0.00E+00 | 0.00E+00 | 1.24E−02 | 1.05E−02 | 0.00E+00 | 0.00E+00 |

I claim:

1. An improved system for the hydrogenation of a silicon tetrahalide and silicon to trihalosilane including a pressure vessel having no internal flow distributors, one or more gas entry ports, one or more solids entry ports, one or more solids drains, and one or more exits for gas/solids mixtures, a plurality of metallurgical grade silicon particles enclosed within said pressure vessel, the improvement comprising:

a first heat exchanger for heating a liquid silicon tetrahalide feed stream, said heated liquid silicon tetrahalide being mixed with hydrogen to reduce the evaporation temperature of the silicon tetrahalide;

a second heat exchanger for vaporizing the mixture of silicon tetrahalide and hydrogen, the heat source being hot gases exiting from other components of the system; and a third heat exchanger for increasing the temperature of the vaporized mixture to between about 500-700° C., the heat being provided by an effluent steam from the pressure vessel, said effluent stream exiting the third heat exchanger providing the heat source for the silicon tetrahalide feed stream entering the first heat exchanger.

2. A system for the hydrogenation of a mixture of silicon tetrahalide and silicon to trihalosilane comprising:

a reactor vessel having a porous bed of metallurgical grade silicon particles enclosed therein, said reactor vessel having one or more gas entry ports in a lower portion thereof, a mixture of vaporized silicon tetrahalide and hydrogen entering the reactor through said one or more gas entry ports, one or more solids entry ports in an upper portion thereof for feeding additional granular metallurgical grade silicon particles to the reactor, one or more drains in the lower portion for removing waste solids and one or more exit ports at a point above the bed for removing effluent trihalosilane gas which may also include entrained solids, a first heat exchanger for heating a liquid silicon tetrahalide feed stream, said heated liquid silicon tetrahalide exiting the first heat exchanger being mixed with hydrogen to reduce the evaporation temperature of the liquid silicon tetrahalide, an evaporator for vaporizing the mixture of silicon tetrahalide and hydrogen, a second heat exchanger for increasing the temperature of the vaporized mixture of silicon tetrahalide and hydrogen to between about 500-700° C., the heat being provided by the effluent trihalosilane gas stream from the reaction vessel, said effluent trihalosilane gas stream exiting the second heat exchanger providing the heat source for the silicon tetrahalide feed stream entering the first heat exchanger.

3. The system of claim 2 wherein the heat source for the evaporator is steam.

4. The system of claim 2 further including a separator for removing entrained solids from the effluent trihalosilane gas exiting the reactor.

5. The system of claim 2 wherein the vaporized mixture of silicon tetrahalide and hydrogen entering the reactor entrains granular metallurgical grade silicon particles, said vaporized mixture with entrained particles impinging on the bed of metallurgical grade silicon particles to cause attrition thereof.

* * * * *